(12) United States Patent
Vaccaro

(10) Patent No.: US 10,690,272 B2
(45) Date of Patent: Jun. 23, 2020

(54) ADAPTER FOR SEALING BOOT FOR ELECTRICAL INTERCONNECTIONS

(71) Applicant: CommScope Technologies LLC, Hickory, NC (US)

(72) Inventor: Ronald A. Vaccaro, Taylorsville, NC (US)

(73) Assignee: CommScope Technologies LLC, Hickory, NC (US)

( * ) Notice: Subject to any disclaimer, the term of this patent is extended or adjusted under 35 U.S.C. 154(b) by 77 days.

(21) Appl. No.: 16/149,755

(22) Filed: Oct. 2, 2018

(65) Prior Publication Data

US 2019/0107230 A1 Apr. 11, 2019

Related U.S. Application Data

(60) Provisional application No. 62/570,687, filed on Oct. 11, 2017.

(51) Int. Cl.
| | | |
|---|---|---|
| *H01R 13/52* | (2006.01) | |
| *F16L 15/04* | (2006.01) | |
| *H02G 15/04* | (2006.01) | |
| *H02G 15/013* | (2006.01) | |
| *H01R 13/623* | (2006.01) | |
| *H01R 13/207* | (2006.01) | |

(52) U.S. Cl.
CPC ............ *F16L 15/04* (2013.01); *H01R 13/521* (2013.01); *H01R 13/5202* (2013.01); *H01R 13/5216* (2013.01); *H02G 15/013* (2013.01); *H02G 15/046* (2013.01); *F16L 2201/80* (2013.01); *H01R 13/207* (2013.01); *H01R 13/623* (2013.01)

(58) Field of Classification Search
CPC ........................................................ H01R 13/52
USPC .......................................................... 174/75 C
See application file for complete search history.

(56) References Cited

U.S. PATENT DOCUMENTS

| | | | |
|---|---|---|---|
| 9,216,530 B2 | 12/2015 | Vaccaro | |
| 9,616,602 B2 | 4/2017 | Vaccaro | |
| 9,667,054 B2 | 5/2017 | Vaccaro | |
| 1,009,066 A1 | 10/2018 | Vaccaro | |
| 2004/0245730 A1 | 12/2004 | Holland et al. | |
| 2009/0170360 A1 | 7/2009 | Shaw et al. | |
| 2012/0100738 A1* | 4/2012 | Palinkas | H02G 15/013 439/277 |

(Continued)

OTHER PUBLICATIONS

Notification of Transmittal of International Search Report and Written Opinion corresponding to PCT/US2018/05923, dated Mar. 19, 2019.

(Continued)

*Primary Examiner* — Stanley Tso
(74) *Attorney, Agent, or Firm* — Myers Bigel, P.A.

(57) ABSTRACT

An adapter for a sealing boot includes: an annular body having a radially-outward exterior surface; at least one helical thread extending radially inwardly to define a threaded interior surface and defining a plurality of roots and crests, wherein the crests extend radially inwardly a distance A from the roots; and a blocking section that extends axially across the plurality of roots and crests, the blocking section extending radially inwardly at least the distance A from the roots at junctions with the crests, and extending radially inwardly a distance B from the roots in areas between the roots and crests.

7 Claims, 3 Drawing Sheets

(56) References Cited

U.S. PATENT DOCUMENTS

2015/0144398 A1    5/2015  Vaccaro
2016/0172836 A1*   6/2016  Vaccaro ............... H02G 15/013
                                                          277/625

OTHER PUBLICATIONS

International Preliminary Report on Patentability corresponding to PCT/US2018/05923, dated Apr. 23, 2020.

* cited by examiner

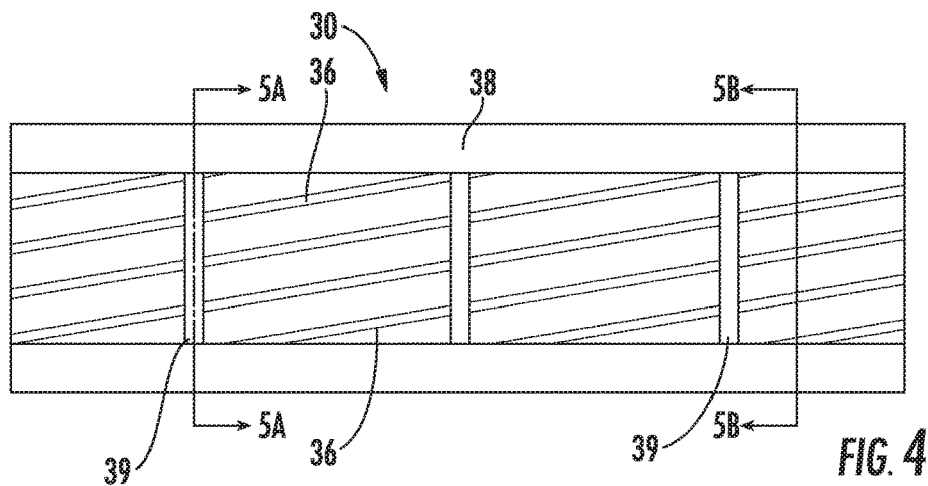
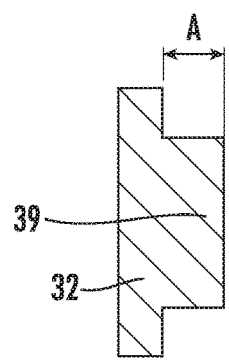
FIG. 5A
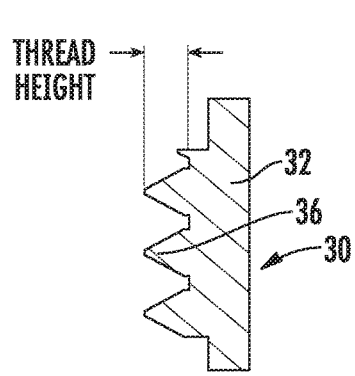
FIG. 5B
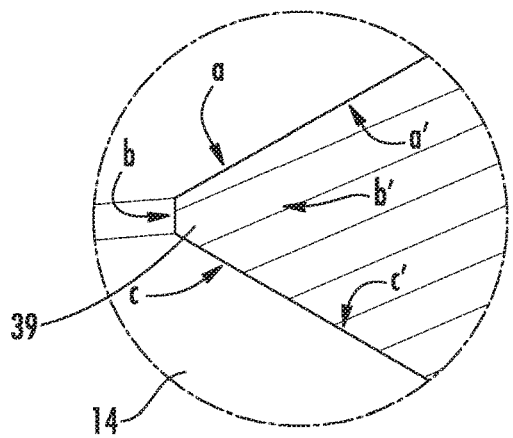
FIG. 5C
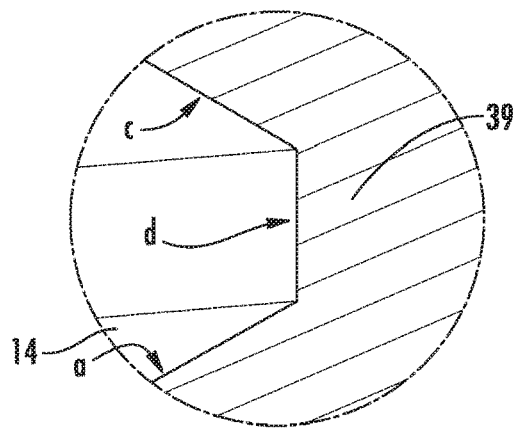
FIG. 5D
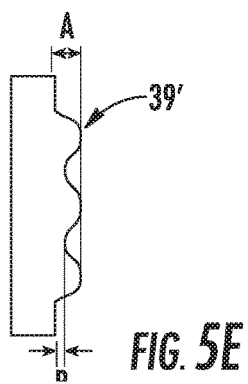
FIG. 5E

ADAPTER FOR SEALING BOOT FOR ELECTRICAL INTERCONNECTIONS

RELATED APPLICATION

The present application claims priority from and the benefit of U.S. Provisional Patent Application No. 62/570,687, filed Oct. 11, 2017, the disclosure of which is hereby incorporated herein in its entirety.

FIELD OF THE INVENTION

The present invention relates generally to a device for environmentally sealing and securing the interconnection between electrical cables.

BACKGROUND

Electrical interconnections, such as the interconnection between two cables or a cable and a piece of electronic equipment, may be subject to degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastic interconnection seals are also known. Elastic seals can be advantageous by virtue of being more easily installed over the typically uneven contours of an electrical interconnection. Exemplary configurations are described in U.S. patent application Ser. No. 13/646,952, filed Oct. 8, 2012, Ser. No. 13/938,475, filed Jul. 10, 2013, and Ser. No. 15/291,292, filed Oct. 12, 2016, the disclosures of each of which are hereby incorporated by reference herein.

SUMMARY

As a first aspect, embodiments of the invention are directed to an adapter for a sealing boot. The adapter comprises: an annular body having a radially-outward exterior surface; at least one helical thread extending radially inwardly to define a threaded interior surface and defining a plurality of roots and crests, wherein the crests extend radially inwardly a distance A from the roots; and a blocking section that extends axially across the plurality of roots and crests, the blocking section extending radially inwardly at least the distance A from the roots at junctions with the crests, and extending radially inwardly a distance B from the roots in areas between the roots and crests.

As a second aspect, embodiments of the invention are directed to an assembly comprising: (a) a threaded stem having an external helical thread and (b) a sealing adapter; and (c) a sealing boot having a sealing neck. The sealing adapter comprises an annular body having: a radially-outward exterior surface; at least one helical thread extending radially inwardly to define a threaded interior surface and defining a plurality of roots and crests, wherein the crests extend radially inwardly a distance A from the roots; and a blocking section that extends axially across the plurality of roots and crests, the blocking section extending radially inwardly at least the distance A from the roots at junctions with the crests, and extending radially inwardly a distance B from the roots in areas between the roots and crests. The sealing neck encircles and seals against the exterior surface of the sealing adapter. The sealing adapter is threaded onto the thread of the threaded stem such that the blocking section forms a seal between the adapter and the threaded stem.

As a third aspect, embodiments of the invention are directed to an adapter for a sealing boot, comprising: an annular body having a radially-outward exterior surface; at least one helical thread extending radially inwardly to define a threaded interior surface and defining a plurality of roots and crests, wherein the crests extend radially inwardly from the roots; and a blocking section that extends axially across the plurality of roots and crests, the blocking section extending radially inwardly to fill areas between the crests.

BRIEF DESCRIPTION OF THE FIGURES

FIG. 4 is an "unrolled" view of the internal thread pattern of a sealing adapter in accordance with embodiments of the invention.

FIG. 5A is a section view of the thread pattern of FIG. 4 taken along lines 5A-5A.

FIG. 5B is a section view of the thread pattern of FIG. 4 taken along lines 5B-5B.

FIG. 5C is an enlarged top view of the void between the threaded stem and the sealing adapter shown in FIG. 3B sealed by a blocking section.

FIG. 5D is an enlarged top view of the void between the threaded stem and the sealing adapter shown in FIG. 3C sealed by a blocking section.

FIG. 5E is a section view of a sealing adapter according to alternative embodiments of the invention.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, exemplary mounting structures for attachment of an electrical cable are shown in FIGS. 1-3C. The mounting structures 10 (in FIGS. 2-3B) and 10' (in FIGS. 1 and 1A) may be any mounting structure having an electrical connector with a threaded stem 12, 12' to which an electrical cable can be attached via a mating connector. As examples, the mounting structures 10, 10' may be an antenna, RRH, or the like.

Figure 1A:
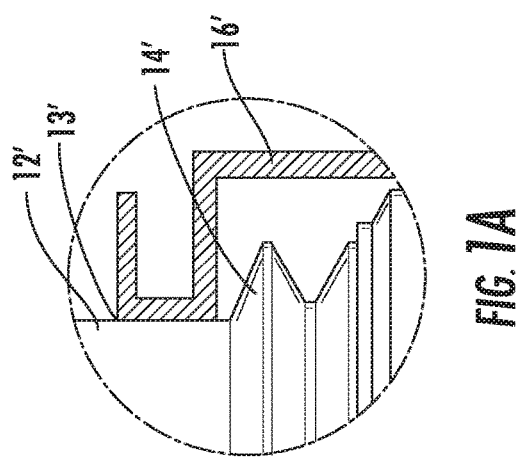
FIG. 1A is a top view of an enlarged section of the threaded stem of FIG. 1 with a sealing boot applied.
Figure 2A:
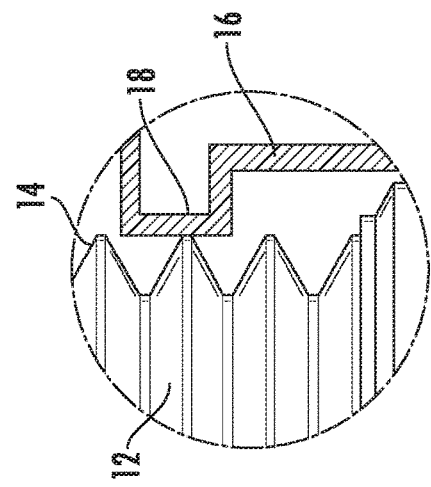
FIG. 2A is a top view of an enlarged section of the threaded stem of FIG. 2 with a sealing boot applied.
Figure 1:
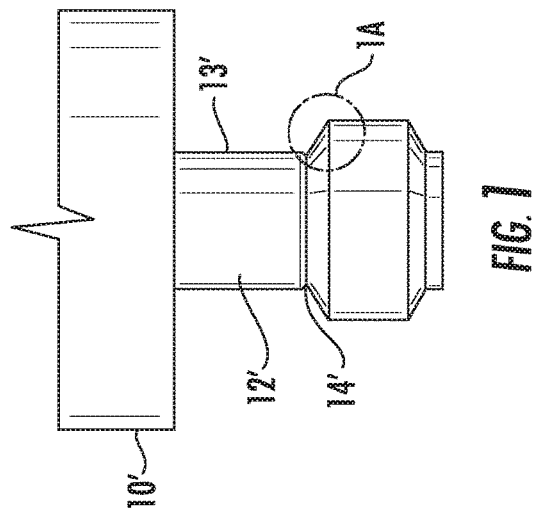
FIG. 1 is a top view of an antenna, remote radio head (RRH) or other mounting structure with a threaded stem for electrical connection.
Figure 2:
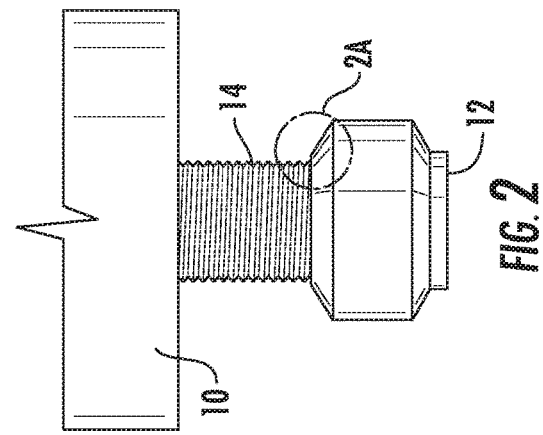
FIG. 2 is a top view of an alternative mounting structure with a threaded stem with threads along most or all of its length.

The mounting structure 10' includes a threaded stem 12' that has a smooth surface 13' adjacent the bulkhead of the mounting structure 10' and a threaded surface 14' on its free end (see FIG. 1A). The smooth surface 13' provides a surface appropriate for sealing with a sealing boot 16' or the like. In contrast, the mounting structure 10 of FIGS. 2 and 2A includes a threaded stem 12 that has a predominantly, if not entirely, threaded surface 14. As can be seen in FIG. 2A, the neck section 18 of a sealing boot 16 (which is typically formed of an elastomeric material such as rubber) contacts the threads of the threaded surface 14, which can create voids in the engagement between the sealing boot 16 and the stem 12 through which water and other environmental agents can seep.

Figure 3:
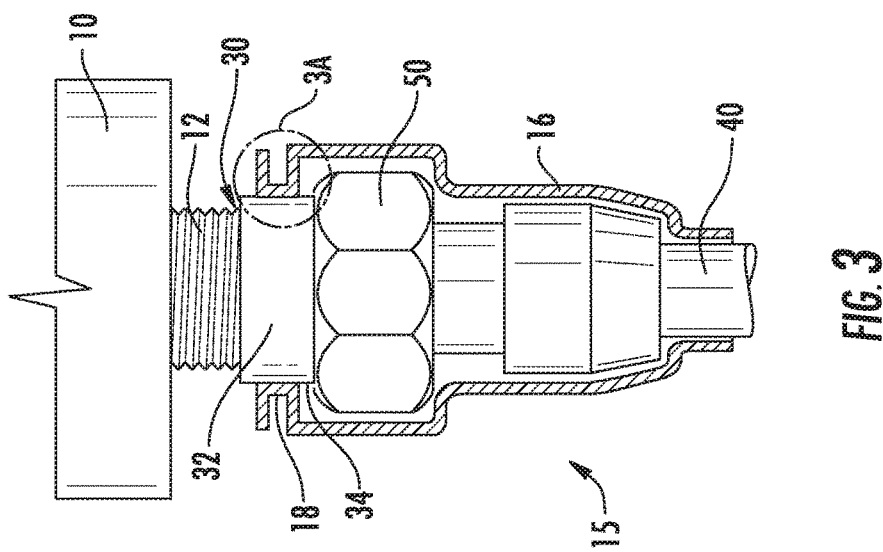
FIG. 3 is a top view of the mounting structure of FIG. 2 including a sealing adapter in accordance with embodiments of the present invention.

Referring now to FIGS. 3-5D, a threaded sealing adapter, designated broadly at 30, is illustrated therein. The sealing adapter 30 is in the form of a nut that threads onto the threaded surface 14 of a threaded stem 12. The sealing adapter 30 includes an annular body 32 having a relatively smooth outer surface 34 that receives the sealing boot 16 and provides a seal. Threads 36 project radially inwardly from the body 32 and intermesh with the threaded surface 14 of the threaded stem 12. Wings 38 extend longitudinally from the ends of the body 32 to assist with assembly of the sealing adapter 30 onto the threaded stem 12. Also shown in FIG. 3 is a coaxial cable 40 that is interconnected with the threaded stem 12 via a coupling nut 50 that is associated with a coaxial connector on the coaxial cable 40.

Figure 3A:
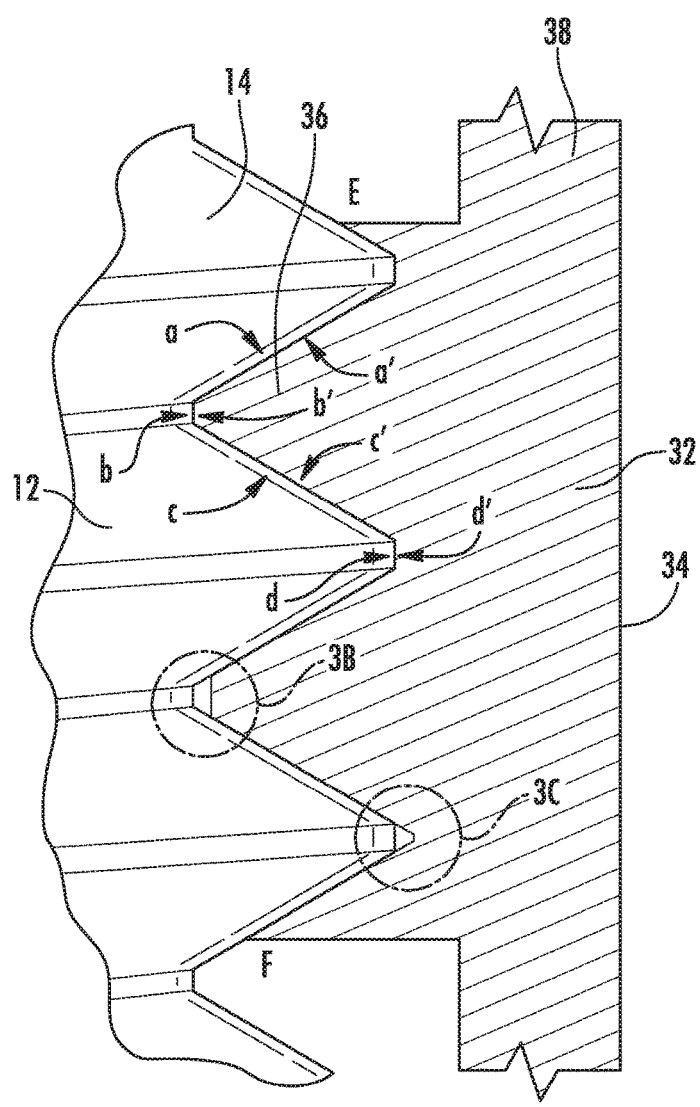
FIG. 3A is a top view of an enlarged top section of the threaded stem and sealing adapter of FIG. 3, wherein undesirable voids between the adapter and the threaded stem are illustrated.
Figure 3B:
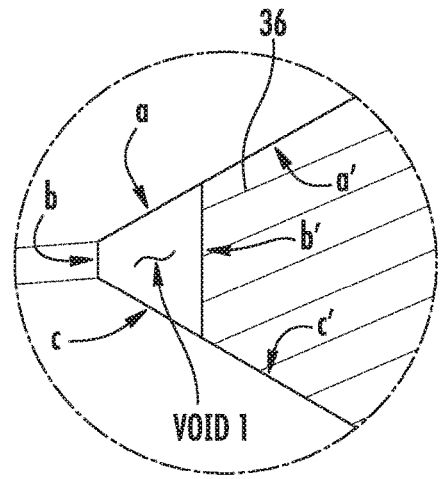
FIG. 3B is an enlarged top view of one of the voids between the threaded stem and the sealing adapter shown in FIG. 3A.
Figure 3C:
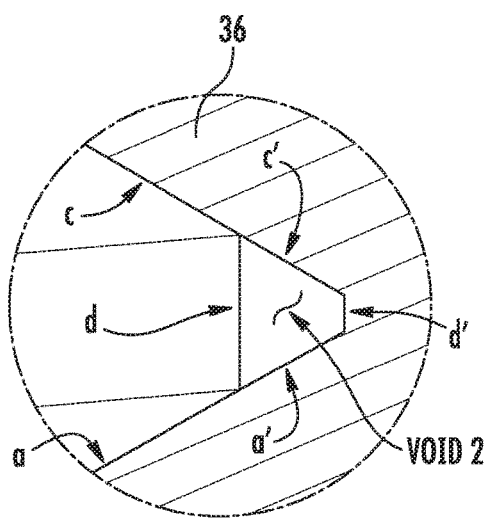
FIG. 3C is an enlarged top/section view of another of the voids between the threaded stem and the sealing adapter shown in FIG. 3A.

As stated above, the sealing adapter 30 is intended to form a seal between the threaded stem 12 and the sealing boot 16; the sealing adapter 30 is intended to form a watertight seal with the threaded stem 12, and the resulting assembly 15 presents the outer surface 34 of the sealing adapter 30 to engage and form a seal with the sealing boot 16. U.S. Pat. No. 9,667,054 to Vaccaro, the disclosure of which is hereby incorporated herein, discusses an approach that relies on the dimensions of the threads 36 of the adapter 30 to create a seal between the adapter 30 and the threaded stem 12. However, FIG. 3B shows an enlarged view of a potential defect at the root (or minor) diameter of the male thread 14 of the threaded stem 12. Void 1 is shown therein and is defined by the trapezoid a, b', c and b. Similarly, FIG. 3C shows an enlarged view of a potential defect at the crest (or major) diameter of the male thread 14 of the threaded stem 12. Void 2 is shown therein and is defined by the trapezoid c', d', a' and d. Void 1 would spiral around the circumference of the thread root b, forming a moisture leak path from end to end (i.e. from E to F in FIG. 3A). Void 2 would spiral around the circumference of the thread crest d, forming a moisture leak path from end to end (again, from E to F in FIG. 3A).

Voids 1 and 2 can be avoided with the adapter 30 according to embodiments of the invention. As can be seen in FIG. 4 (which is an "unrolled" depiction of the cylindrical inner surface of the adapter 30), the internal threads 36 of the sealing adapter 30 are helical, and as shown in FIG. 5B, for most of the length of the threads 36, they are conventional, with a triangular or wedge-shaped cross-section. However, at one or more locations along the threads 36, a blocking section 39 extends axially and spans the threaded area. As shown in FIG. 5A, the blocking section extends radially inwardly a distance A to the same (or greater) extent as the threads 36.

The purpose of the blocking sections 39 can be understood with reference to FIGS. 5C and 5D. The adapter 30 is applied to the threaded stem 12 in a conventional manner (i.e., by rotating the adapter 30 relative to the stem 12 such that the threads 36 of the adapter 30 mesh with the threads 14 of the stem 12). As such, for most of the extent of the threads 14, 36, there is the risk of Voids 1 and 2 being formed at the root and crest of the threads in the manner discussed above. However, in the areas of the threads 36 where blocking sections 39 are present, the blocking sections 39 reach into the roots of the threads 14 and fill the voids at Void 1, thereby providing a seal in these locations. The blocking sections 39 compress or deflect due to the crests of the threads 14, thereby filling the voids at Void 2. Thus, the blocking sections 39 provide sealing capability to the adapter 30 to prevent unwanted ingress of moisture.

The adapter 30 may be formed of any material that is sufficiently compressible to enable the blocking sections 39 to compress at the crests of the threads 14 (and enable the adapter 30 to be threaded onto the stem 12) while still being able to reach the roots of the threads 14. Exemplary materials include elastomeric materials like silicone rubber, EPDM and neoprene rubber.

Those of skill in this art will appreciate that the blocking sections 39 may take different forms. For example, rather than the blocking sections 39 being of constant thickness as shown, they may vary in thickness across their length; as exemplary variations, the blocking sections may be scalloped, undulating, sinuous, saw-toothed, or the like, wherein the crest of the blocking section 39' extends radially inwardly a sufficient distance A to seal against the root of the threads 14 of the stem 12, but with the "root" of the blocking section 39 being recessed somewhat to a distance B (see FIG. 5E). Also, although three blocking sections 39 are shown herein in FIG. 4, in some embodiments more or fewer blocking sections 39 may be employed. Other variations may be apparent to those of skill in his art.

Those of skill in this art will recognize that the adapter 30 may take different forms. For example, the wings 38 may be omitted. As another example, the threads 36 may take the form of a single helical thread, or more than the two helical threads illustrated herein. The axial length of the adapter 30 may vary, depending on the type or style of stem on which the adapter 30 is mounted.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An adapter for a sealing boot, comprising:
an annular body having a radially-outward exterior surface;
at least one helical thread extending radially inwardly to define a threaded interior surface and defining a plurality of roots and crests,
wherein the crests extend radially inwardly a distance A from the roots;
and a blocking section that extends axially across the plurality of roots and crests,
the blocking section extending radially inwardly at least the distance A from the roots at junctions with the crests,
and extending radially inwardly a distance B from the roots in areas between the roots and crests,
wherein the distance A is the same as the distance B,
wherein the blocking section is a first blocking section,
and further comprising a second blocking section that extends axially across the plurality of roots and crests,
the second blocking section extending radially inwardly at least the distance A from the roots at junctions with the crests,
and extending radially inwardly a distance B from the roots in areas between the roots and crests,
the second blocking section being circumferentially separated from the first blocking section,
in combination with a bulkhead connector having a threaded stem, the adapter being threaded onto an external thread of the threaded stem to form a seal between the adapter and the threaded stem.

2. The adapter defined in claim 1, comprising a resilient material.

3. The adapter defined in claim 2, wherein the resilient material is selected from the group consisting of: silicone rubber, EPDM and neoprene rubber.

4. The adapter defined in claim 1, in combination with a sealing boot having a sealing neck, wherein the sealing neck encircles and seals against the exterior surface of the adapter.

5. An assembly, comprising:
(a) a threaded stem having an external helical thread;
(b) a sealing adapter comprising an annular body having:
a radially-outward exterior surface;
at least one helical thread extending radially inwardly to define a threaded interior surface and defining a plurality of roots and crests,
wherein the crests extend radially inwardly a distance A from the roots;
and a blocking section that extends axially across the plurality of roots and crests,
the blocking section extending radially inwardly at least the distance A from the roots at junctions with the crests,
and extending radially inwardly a distance B from the roots in areas between the roots and crests;
wherein the distance A is the same as the distance B;
and (c) a sealing boot having a sealing neck; wherein the sealing neck encircles and seals against the exterior surface of the sealing adapter;
and wherein the sealing adapter is threaded onto the thread of the threaded stem such that the blocking section forms a seal between the adapter and the threaded stem;
wherein the blocking section is a first blocking section,
and further comprising a second blocking section that extends axially across the plurality of roots and crests,
the second blocking section extending radially inwardly at least the distance A from the roots at junctions with the crests,
and extending radially inwardly a distance B from the roots in areas between the roots and crests,
the second blocking section being circumferentially separated from the first blocking section,
in combination with a bulkhead connector having a threaded stem, the adapter being threaded onto an external thread of the threaded stem to form a seal between the adapter and the threaded stem.

6. The adapter defined in claim 5, comprising a resilient material.

7. The adapter defined in claim 6, wherein the resilient material is selected from the group consisting of: silicone rubber, EPDM and neoprene rubber.

* * * * *